(12) United States Patent
Bichler et al.

(10) Patent No.: US 8,567,826 B2
(45) Date of Patent: Oct. 29, 2013

(54) GAS NOZZLE ATTACHMENT

(75) Inventors: Thomas Bichler, Schlierbach (AT);
Stefan Ehrenbrandner, Micheldorf (AT); Johannes Fuerlinger, Sipbachzell (AT); Armin Gaspar, Wels (AT)

(73) Assignee: Fronius International GmbH, Pettenbach (AT)

( * ) Notice: Subject to any disclaimer, the term of this patent is extended or adjusted under 35 U.S.C. 154(b) by 273 days.

(21) Appl. No.: 12/735,513

(22) PCT Filed: Jan. 23, 2009

(86) PCT No.: PCT/AT2009/000023
§ 371 (c)(1),
(2), (4) Date: Sep. 16, 2010

(87) PCT Pub. No.: WO2009/092125
PCT Pub. Date: Jul. 30, 2009

(65) Prior Publication Data
US 2011/0006522 A1 Jan. 13, 2011

(30) Foreign Application Priority Data
Jan. 23, 2008 (AT) .................................. A 91/2008

(51) Int. Cl.
*F16L 37/00* (2006.01)
(52) U.S. Cl.
USPC ........................................... 285/321; 219/74
(58) Field of Classification Search
USPC ............... 285/321, 314, 305; 219/74, 121.33, 219/121.51, 121.55
See application file for complete search history.

(56) References Cited

U.S. PATENT DOCUMENTS

| 3,125,649 | A | * | 3/1964 | St. Cyr | 219/74 |
| 3,128,370 | A | * | 4/1964 | Meyer | 219/137.42 |
| 3,129,777 | A | * | 4/1964 | Haspert | 285/321 |
| 3,230,342 | A | * | 1/1966 | Meyer | 285/321 |
| 3,438,656 | A | * | 4/1969 | Fritch | 285/321 |
| 3,576,423 | A | * | 4/1971 | Bernard et al. | 219/137.52 |
| 3,676,640 | A | * | 7/1972 | Bernard et al. | 219/74 |
| 4,358,662 | A | * | 11/1982 | Cranor et al. | 219/74 |
| 4,464,560 | A | * | 8/1984 | Church et al. | 219/74 |
| 4,554,432 | A | * | 11/1985 | Raloff | 219/74 |
| 6,207,921 | B1 | * | 3/2001 | Hanna | 219/74 |
| 6,586,708 | B1 | * | 7/2003 | Cusick | 219/74 |

(Continued)

FOREIGN PATENT DOCUMENTS

DE  100 15 506  12/2001
DE  203 80 292  5/2005

(Continued)

OTHER PUBLICATIONS

International Search Report.

*Primary Examiner* — David E Bochna
(74) *Attorney, Agent, or Firm* — Collard & Roe, P.C.

(57) ABSTRACT

An attachment system, for attaching a gas nozzle on a gas nozzle mount arranged on a welding torch, allows detachable attachment of the gas nozzle. To create such an attachment one part of the gas nozzle mount is designed to be eccentric and for mounting a fixing element. Via an additional part of the gas nozzle mount and via at least one part of a penstock of the welding torch, a guide is formed for the gas nozzle and the gas nozzle can be secured via a rotational movement.

4 Claims, 5 Drawing Sheets

(56) References Cited

U.S. PATENT DOCUMENTS

| | | | |
|---|---|---|---|
| 7,342,200 B2 * | 3/2008 | Eberle .................... 219/137.31 |
| 2007/0062922 A1 | 3/2007 | Zamuner |
| 2007/0243009 A1 | 10/2007 | Wang |

FOREIGN PATENT DOCUMENTS

| | | |
|---|---|---|
| EP | 0 620 075 | 10/1994 |
| GB | 185 942 | 9/1922 |
| GB | 2 192 821 A | 1/1988 |
| GB | 2 220 163 | 1/1990 |
| JP | 63-10082 A | 1/1988 |
| JP | 2004-314181 A | 11/2004 |
| WO | WO 2004/026518 | 4/2004 |
| WO | WO 2006/100936 A1 | 9/2006 |

* cited by examiner

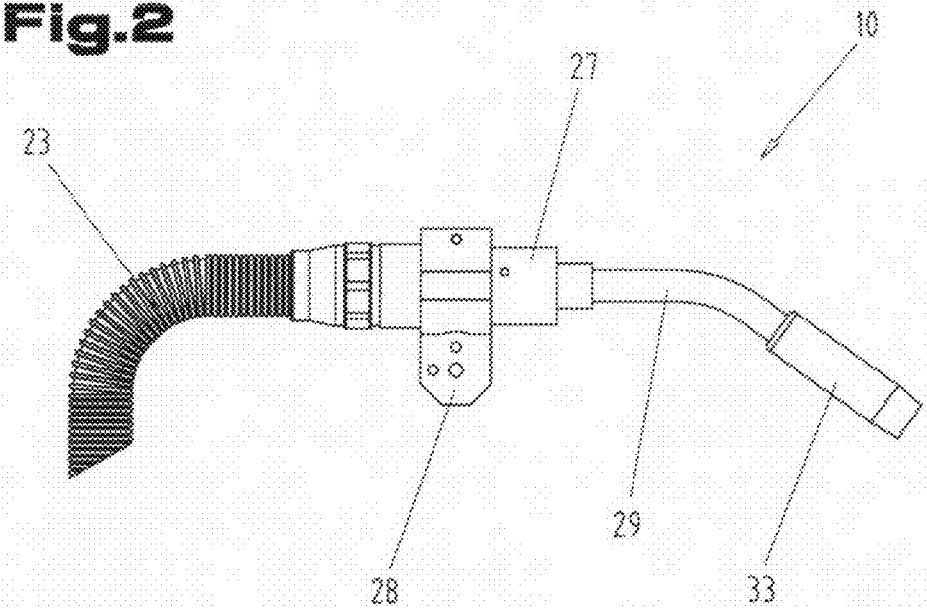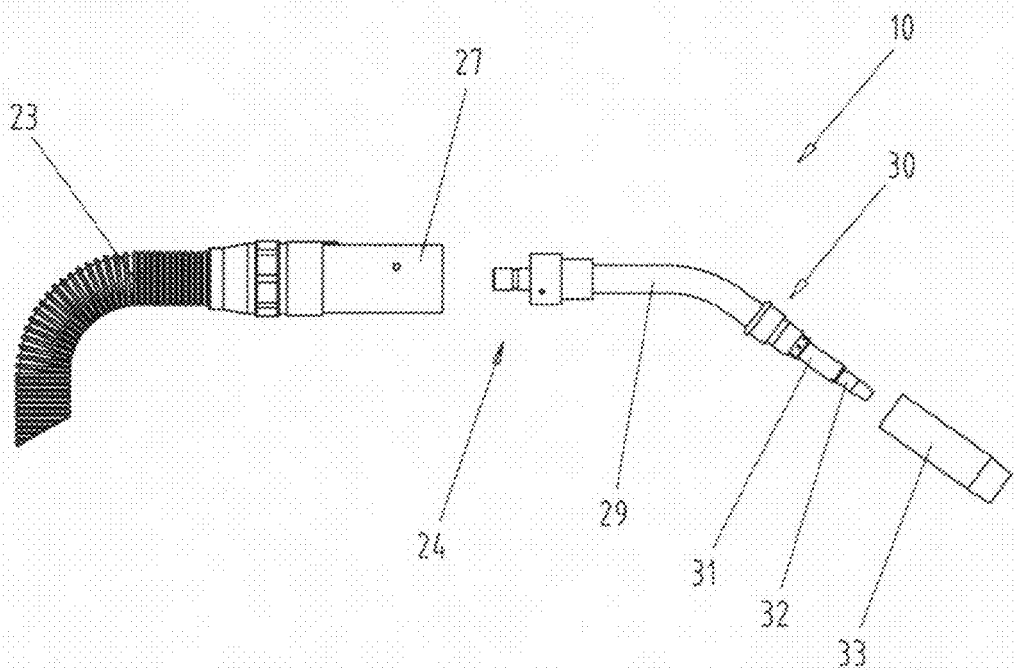

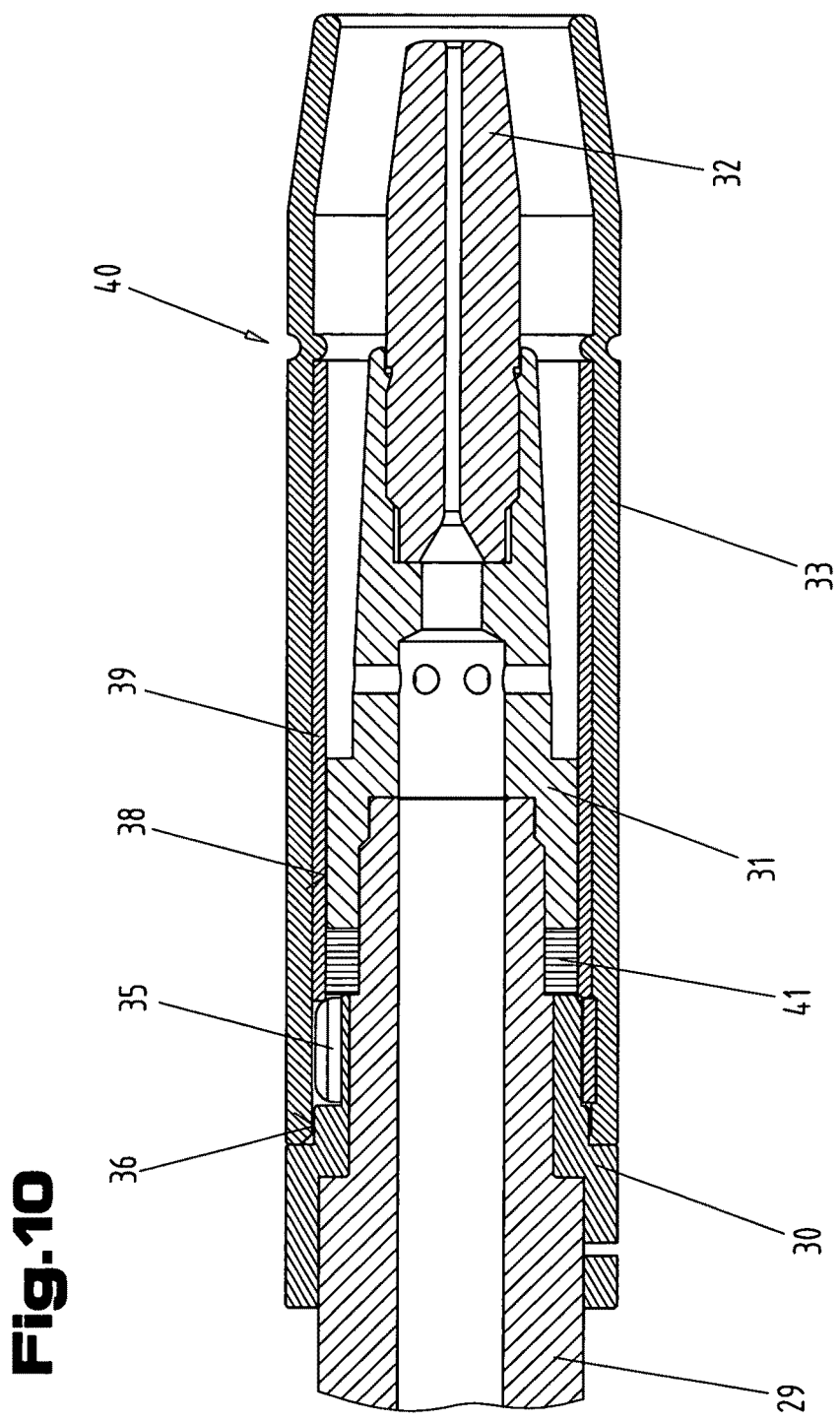

US 8,567,826 B2

GAS NOZZLE ATTACHMENT

CROSS REFERENCE TO RELATED APPLICATIONS

This application is the National Stage of PCT/AT2009/000023 filed on Jan. 23, 2009, which claims priority under 35 U.S.C. §119 of Austrian Application No. A 91/2008 filed on Jan. 23, 2008. The international application under PCT article 21(2) was not published in English.

BACKGROUND OF THE INVENTION

1. Field of the Invention

The invention relates to a system for securing a gas nozzle onto a gas nozzle mount arranged on a welding torch, which is designed for the detachable attachment of the gas nozzle.

The invention also relates to a gas nozzle for a welding torch, which is designed to be tubular and surrounds at least one penstock and is attached onto a gas nozzle mount.

2. The Prior Art

Attachment systems for gas nozzles of a welding torch are already known, in which the gas nozzle is fitted in a simple manner directly onto a basic body. For this mostly slots are provided in the gas nozzle and the gas nozzle is held by means of their tensioning. Furthermore, torches are also known in which a screw connection is provided on the basic body for mounting the gas nozzle. Likewise an attachment system is known in which the gas nozzle is fixed by a short rotational movement, as known from DE 203 80 292 U1.

A disadvantage of such attachment systems is that for the attachment additional means or manufacturing steps are required with regard to the gas nozzle, such as a thread, several slots or two projections. In particular, it is also a disadvantage in DE 203 80 292 U1 that for the attachment the position of the gas nozzle has to be taken into consideration.

SUMMARY OF THE INVENTION

Therefore, the objective of the invention is to create an attachment system for a connectable and very simply designed gas nozzle, the function of which is independent of the position of the gas nozzle when pushing or fitting onto the gas nozzle guide.

The objective of the invention is achieved in that for the attachment a part of the gas nozzle mount is designed to be eccentric and for mounting a fixing element and in that by means of an additional part of the gas nozzle mount with at least one part of a penstock of the welding torch a guide is formed for the gas nozzle and the gas nozzle can be secured by a rotational movement.

It is an advantage in this case that with a further aspect of the invention there can be a rapid and reliable attachment by means of a short rotational movement regardless of the direction of rotation and the position of the gas nozzle prior to the attachment is not relevant. The gas nozzle can therefore be fitted on easily. Furthermore, in this way it is easy to replace the worn parts required for the attachment system.

Further features are also advantageous, which enable the rotation of the fixing element by simple rotation of the gas nozzle and simple detachment and removal of the gas nozzle.

Similarly, the objective of the invention is achieved in that two concentric guiding surfaces are formed in the gas nozzle, whereby a guiding surface is formed for guiding on the penstock and the additional guiding surface is formed for guiding on the gas nozzle mount.

The resulting advantages are the same as described above.

In an advantageous manner according to further features of the invention a stop is formed which, in particular, positions the fixing element.

BRIEF DESCRIPTION OF THE DRAWINGS

The present invention is explained in more detail with reference to the enclosed schematic drawings.

FIG. 2 shows a schematic view of a welding torch in side view;

FIG. 3 shows the welding torch according to FIG. 2 in an exploded view;

FIG. 10 shows the components of the attachment system according to the invention in an assembled state and in cross section.

DETAILED DESCRIPTION OF THE PREFERRED EMBODIMENTS

Figure 1:
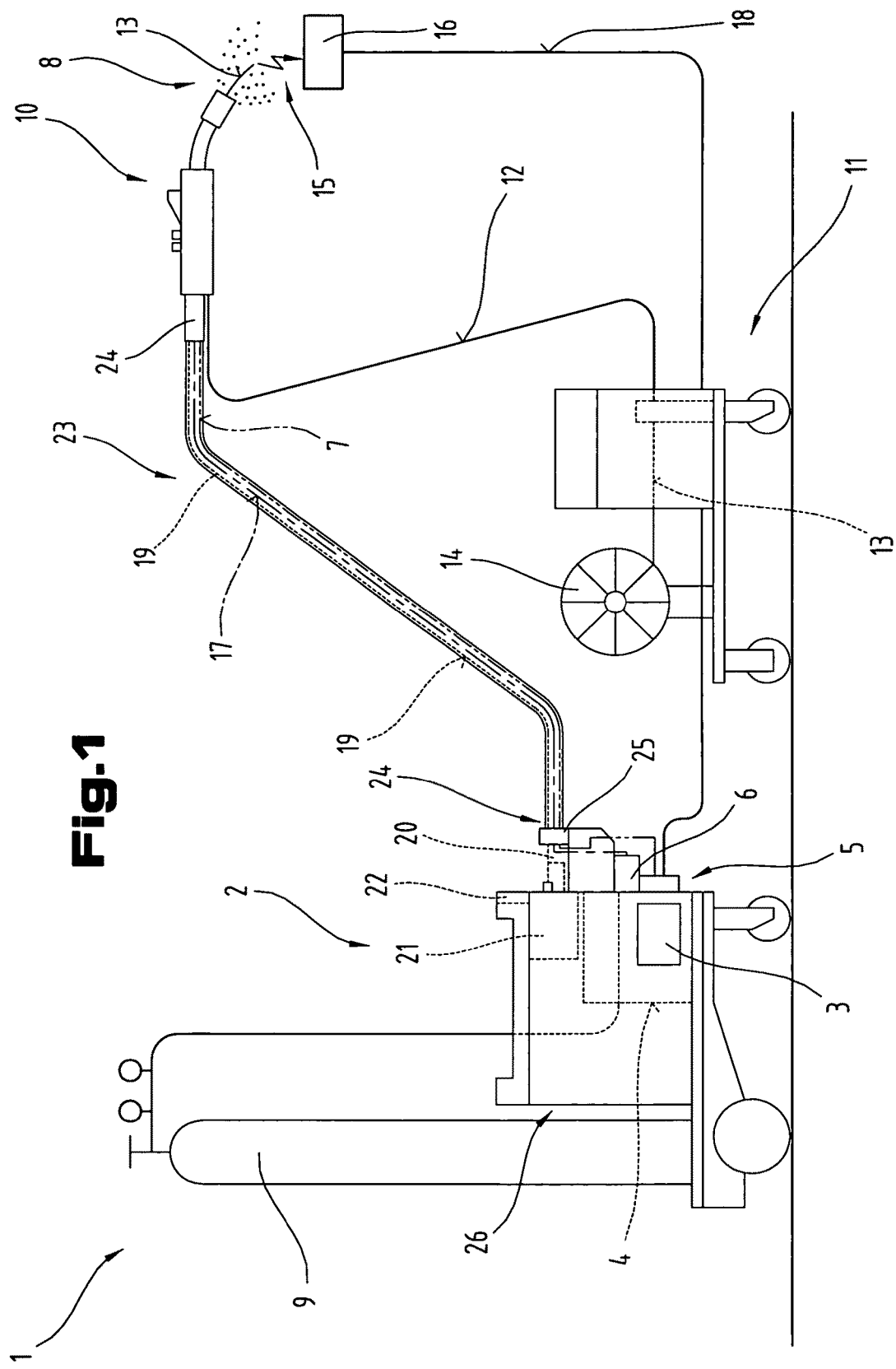
FIG. 1 shows a schematic view of a welding machine or a welding device.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows a welding device 1 or a welding system for various different processes or methods, such as e.g. MIG/MAG welding or WIG/TIG welding or electrode welding methods, double-wire/tandem-welding methods, plasma welding or soldering etc.

The welding device 1 comprises a current source 2 with a power element 3, a control device 4 and a switching member 5 assigned to the power element 3 or the control device 4. The switching member 5 or the control device 4 is connected to a control valve 6, which is arranged in a supply line 7 for a gas 8, in particular a protective gas, such as for example $CO_2$, helium or argon and the like between a gas tank 9 and a welding torch 10 or torch.

In addition by means of the control device 4 a wire feed device 11, which is usual for MIG/MAG welding, can be controlled, whereby by means of a supply line 12 an additional material or a welding wire 13 can be supplied from a delivery spool 14 or a wire roll into the region of the welding torch 10. Of course it is possible for the wire feed device 11, as known from the prior art, to be integrated into the welding device 1, in particular into the basic housing, and not to be designed as an additional device, as shown in FIG. 1

It is also possible that the wire feed device 11 feeds the welding wire 13 or the additional material outside the welding torch 10 to the processing point, whereby for this in the welding torch 10 preferably a non-fusing electrode is arranged, as is usually the case in WIG/TIG-welding.

The current for creating an arc 15, in particular a working arc, between the non-fusing electrode (not shown) and a workpiece 16 is supplied via a welding line 17 from the power element 3 of the current source 2 to the welding torch 10, in particular the electrode, whereby the workpiece 16 to be welded, which is made up of several parts, is also connected via an additional welding line 18 to the welding device 1, in particular to the current source 2, and thus a circuit can be created via the arc 15 or the plasma beam formed for a process.

For cooling the welding torch 10 via a cooling circuit 19 the welding torch 10 can be connected with the interconnection of a flow indicator 20 to a liquid container, in particular a water container 21, whereby when operating the welding torch 10 the cooling circuit 19, in particular a liquid pump used for the liquid arranged in the water container 2, is started and thus the welding torch 10 can be cooled effectively.

The welding device 1 also comprises an input and/or output device 22, by means of which the different welding parameters, operating modes or welding programs of the welding device 1 can be adjusted or requested. In this way the welding parameters, modes of operation or welding programs set via the input and/or output device 22 are forwarded to the control device 4 and the latter controls the individual components of the welding system or the welding device 1 and corresponding reference values are determined for the regulation or control.

Furthermore, in the shown exemplary embodiment the welding torch 10 is connected via a hose package 23 to the welding device 1 or the welding system. In the hose package 23 the individual lines from the welding device 1 to the welding torch 10 are arranged. The hose package 23 is connected via a coupling device 24 to the welding torch 10, whereas the individual lines in the hose package 23 are connected to the individual contacts of the welding device 1 via connection sockets or plug connections. To ensure the strain relief of the hose package 23, the hose package 23 is connected via a strain relief device 25 to a housing 26, in particular the basic housing of the welding device 1. Of course it is also possible for the coupling device 24 to be used for the connection to the welding device 1.

In principle, it should be mentioned that for the different welding methods or welding devices 1, such as for example WIG devices or MAGMA-devices or plasma devices, not all of the previously named components have to be used or employed. It is possible for example for the welding torch 10 to be designed as an air-cooled welding torch 10.

Generally with regard to the following FIG. 2 bis 10 it should be mentioned that the latter should be considered overall in a general view.

FIGS. 2 and 3 show a much simplified structure of a welding torch 10 formed by a conventional MIG torch. In this case FIG. 2 shows the welding torch 10 in an assembled state with a holder 28 arranged on a holding element 27 or torch handle for machine use, in particular a robot welding system, which can be omitted in the case of a hand-guided welding torch 10. FIG. 3 shows an exploded view of the main components of the welding torch 10, namely the hose package 23, the holding element 27, a pipe bend 29, a gas nozzle mount 30, a penstock 31, a contact pipe 32 and a gas nozzle 33. Said components are mainly joined together by methods known from the prior art. For example the pipe bend 29 is connected via the coupling device 24 to the hose package 23 or the holding element 27 and attaches the gas nozzle 33 to the gas nozzle mount 30.

According to the invention the gas nozzle 33 is secured to the gas nozzle mount 30 by means of an eccentric mount 34 arranged on the gas nozzle mount 30. Said eccentric mount 34 in combination with a fixing element 35 enables an extremely flexible method of securing the gas nozzle 33.

Figure 4:
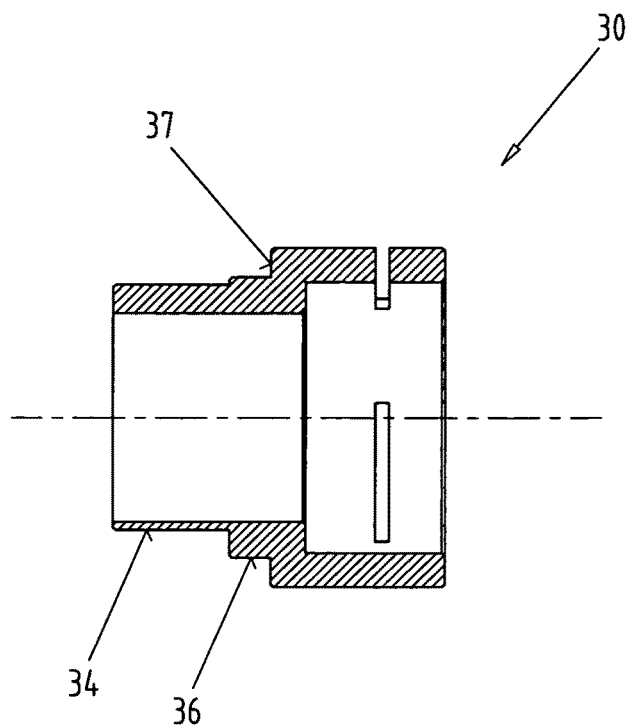
FIG. 4 shows a gas nozzle mount in cross section.
Figure 5:
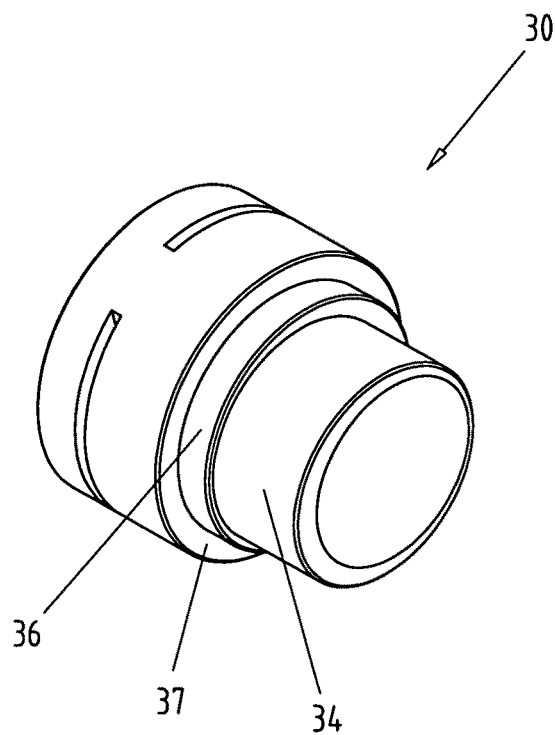
FIG. 5 shows the gas nozzle mount in three dimensions.

The gas nozzle mount 30 with the eccentric mount 34 according to the invention is shown in detail in FIGS. 4 and 5. In this cross sectional view the step-like shape of the gas nozzle mount 30 is shown. In this case the lowest or first step, that is the part of the gas nozzle mount 30 with the smallest external diameter, is designed to be eccentric and for mounting the fixing element 35 and thus represents the eccentric mount 34. The cross sectional view shows both the lowest and the highest point of the eccentric step. In this way it is ensured that the gas nozzle 33 can be secured. However, to ensure that the longitudinal middle axis of the gas nozzle 33 corresponds substantially to the path of the welding wire 13, the second step is designed as a guiding or centering surface 36 for the gas nozzle 33. In the end the face side of the third step is designed as a stop surface 37 for the gas nozzle 33. The gas nozzle mount 30 also has an opening, so that this can preferably be secured by press fit onto the pipe bend 29.

Figure 6:
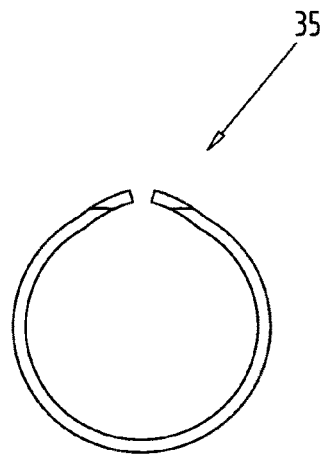
FIG. 6 shows a fixing element in side view.
Figure 7:
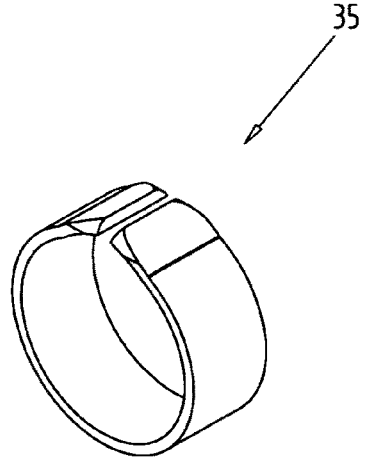
FIG. 7 shows the fixing element in a three-dimensional view.

The fixing element 35 can be formed—as shown in detail in FIG. 6 and FIG. 7—for example by a resilient ring or an open ring. These drawings also show that the open ends of the fixing element 35 are bent up so that the latter essentially has the form of an eccentric. The purpose of this construction is that during the positioning of the fixing element 35 on the eccentric mount 34 the open ends of the fixing element 35 are located at the thinnest point of the eccentric mount 34, so that substantially a flush sealing is obtained in radial direction with the cylindrical guiding surface 36. It is thus ensured that the gas nozzle 33 can be pushed or fitted up to the stop surface 37. Likewise the bent up ends are used so that during a rotational movement of the gas nozzle 33 the fixing element 35 is also rotated. This is based on the fact that because of the eccentric shape of the fixing element 35 the latter is clamped in the gas nozzle 33.

Figure 8:
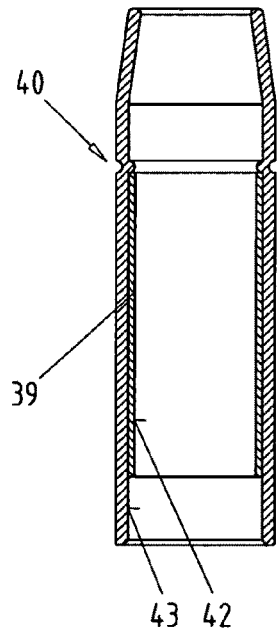
FIG. 8 shows a gas nozzle in cross section.
Figure 9:
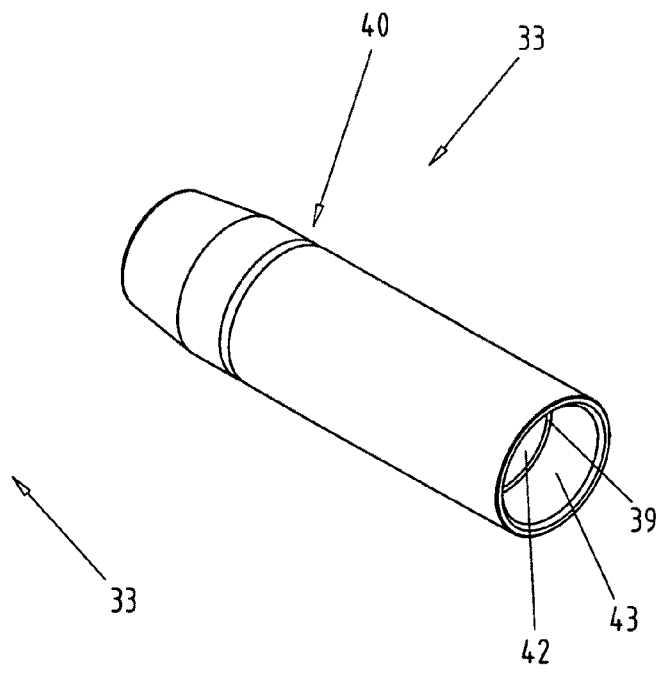
FIG. 9 shows the gas nozzle in three dimensions.

Next to the guiding surface 36 also at least one part of the penstock 31 forms a second guiding surface 38 for the gas nozzle 33. Said cylindrical guiding surface 38 preferably has a smaller diameter than the coaxial cylindrical guiding surface 36, so that at least one electrical insulation of the gas nozzle 33 relative to the penstock 31 can be used. This is shown in FIGS. 8 and 9. In principle the gas nozzle 33 for the attachment system according to the invention is designed to be tubular, whereby an inexpensive manufacture is ensured. For this reason also an insulating insert 39 arranged in the gas nozzle 33 can be produced or made available inexpensively. Said insulating insert 39 is guided accordingly on the guiding surface 38 of the penstock 31 so that the insulating insert 39 substantially forms a guiding surface 42 corresponding to the guiding surface 38. Said guiding surface 42 or the insulating insert 39 thus do not extend over the entire length of the gas nozzle 33. Preferably, the gas nozzle 33 in the front section comprises a groove 40 which in the gas nozzle 33 forms a stop for the insulating insert 39. By means of the groove 40 also the tubular part of the gas nozzle 33 is defined, the length of which is adjusted to the additional components of the welding torch 10. In this case for the attachment system according to the invention it is significant that the insulating insert 39 is shorter than the tubular part of the gas nozzle 33. This results in the mentioned different diameters of guiding surface 36 and guiding surface 38, whereby the latter are concentric to one another. The said difference in length corresponds to the sum of the length of the first and the second step of the gas nozzle mount 30. Thus the gas nozzle 33 is guided directly on the guiding surface 36 or the fixing element 35 is rotated accordingly by the gas nozzle 33. Consequently, a guiding surface 43 in the gas nozzle 33 corresponds to the guiding surface 36 of the gas nozzle mount 30. Furthermore, from the aforementioned difference in length a step or a stop is formed inside the gas nozzle 33, which substantially positions the fixing element 35 on the eccentric mount 34, so that the latter is not displaceable along the longitudinal axis.

In FIG. 10 the gas nozzle 33 attached onto the pipe bend 29 according to the attachment system of the invention is shown in cross section. In this case in particular the guiding surface 36 and the guiding surface 38 are shown clearly which are the basic requirement for a central attachment and guiding for the gas nozzle 33. The resilient ring is also clearly identifiable as the fixing element 35, whereby the position of the fixing element 35 on the eccentric mount 34 is selected so that the gas nozzle 33 can be fitted on, i.e. so that both open ends of the fixing element 35 close with respect to their radial height practically flush with the guiding surface 36.

If the gas nozzle 33 is now rotated briefly in any direction the open ends of the fixing element 35 are also rotated, so that the latter are clamped between the gas nozzle 33 and the eccentric mount 34 and the gas nozzle 33 is clamped in the guide and secured. To disconnect the connection the gas nozzle 33 is rotated accordingly in the opposite direction until the open ends are in the shown position, so that the gas nozzle 33 can be removed. For the user this position can be easily identified in that the gas nozzle 33 can be rotated very easily in this small area—as in the shown position.

As the fixing element 35 has a certain amount of tension through the open ends, in this way also a self-supporting hold is ensured on the eccentric mount 34. This means that on detaching the gas nozzle 33 the fixing element 35 remains in this position independently, so that during the next attachment of the gas nozzle 33 the latter can be secured straight away by a short rotational movement.

It is also shown in FIG. 10 that between the penstock 31 and gas nozzle mount 30 an insulating ring 41 is arranged which provides at least one electrical insulation from the gas nozzle mount 30 or the gas nozzle 33. In addition, the latter lengthens the guiding surface of the penstock 31 and forms a stop for the fixing element 35. This means that on removing the gas nozzle 33 the fixing element 35 is held by the insulating ring 41 on the eccentric mount 34.

By means of such an attachment system in an advantageous manner all of the parts of the attachment system, namely the gas nozzle 33, penstock 31, insulating ring 41 and fixing element 35 are easily exchanged. This is significant as the said parts are mainly wearing parts which have to be exchanged regularly.

Furthermore, the gas nozzle mount 30 according to the invention of the attachment system according to the invention can also be attached detachably on the pipe bend 29, for example by means of a self-securing screw connection or the like. This has the advantage that in the case of heavy wear of the eccentric mount 34 also the gas nozzle mount 30 can be exchanged as a wearing element in a simple manner. For this it is also conceivable that the eccentric mount 34 is secured detachably to the gas nozzle mount 30, so that in the case of heavy wear only the latter has to be changed.

In general it should be mentioned that the securing system according to the invention and the gas nozzle according to the invention are not restricted to use on a welding torch, but can also be used in the same form for cutting torches.

Finally, as a point of formality, it should be noted that for a better understanding of the structure of the devices according to the invention the latter and their components have not been represented true to scale in part and/or have been enlarged and/or reduced in size.

The problem addressed by the independent solutions according to the invention can be taken from the description.

Mainly the individual embodiments shown in FIGS. 4 to 10 can form the subject matter of independent solutions according to the invention. The objectives and solutions according to the invention relating thereto can be taken from the detailed descriptions of these figures.

LIST OF REFERENCE NUMERALS

1 Welding device
2 Current source
3 Power element
4 Control device
5 Switching member
6 Control device
7 Supply line
8 Gas
9 Gas tank
10 Welding torch
11 Wire feed device
12 Supply line
13 Welding wire
14 Delivery spool
15 Arc
16 Workpiece
17 Welding line
18 Welding line
19 Cooling circuit
20 Flow indicator
21 Water container
22 Input and/or output device
23 Hose package
24 Coupling device
25 Strain relief device
26 Housing
27 Holding element
28 Holder
29 Pipe bend
30 Gas nozzle mount
31 Penstock
32 Contact pipe
33 Gas nozzle
34 Eccenter mount
35 Fixing element
36 Guiding surface
37 Stop surface
38 Guiding surface
39 Insulating insert
40 Groove
41 Insulating ring
42 Guiding surface
43 Guiding surface

The invention claimed is:

1. An attachment system comprising a gas nozzle, a gas nozzle mount arranged on a welding torch, and an annular fixing element, whereby a first portion of the gas nozzle mount is designed to be eccentric, wherein the eccentric portion of the gas nozzle mount is designed for mounting the annular fixing element, and wherein via a second portion of the gas nozzle mount in combination with at least one portion of a penstock of the welding torch a guide is formed for the gas nozzle and the gas nozzle can be attached by a first rotational movement, wherein the annular fixing element is formed by an open ring having ends, and wherein the ends of the annular fixing element are raised in a radial direction relative to a circular outline of the annular fixing element.

2. The attachment system according to claim 1, wherein when the annular fixing element is pushed on or fitted on the first portion of the gas nozzle mount, the annular fixing element can be rotated in any direction of rotation starting from any position of the annular fixing element on the first portion of the gas nozzle mount, wherein the annular fixing element for mounting the gas nozzle is located in a rotational position, and wherein in the rotational position the annular fixing element ensures a closure that is flush in radial direction with the second portion of the gas nozzle mount.

3. The attachment system according to claim 1, wherein the annular fixing element can be rotated by a rotational movement of the gas nozzle and the gas nozzle can be clamped and secured in the guide.

4. The attachment system according to claim 1, wherein the annular fixing element can be rotated in a second rotational direction opposite to the first rotational direction, and the gas nozzle can be detached from the guide and removed via rotation of the annular fixing element in the second rotational direction.

* * * * *

UNITED STATES PATENT AND TRADEMARK OFFICE
CERTIFICATE OF CORRECTION

PATENT NO.        : 8,567,826 B2
APPLICATION NO.   : 12/735513
DATED             : October 29, 2013
INVENTOR(S)       : Bichler et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 327 days.

Signed and Sealed this

Fifteenth Day of September, 2015

Michelle K. Lee
*Director of the United States Patent and Trademark Office*